US012735112B2

(12) United States Patent
Kim et al.

(10) Patent No.: US 12,735,112 B2
(45) Date of Patent: Sep. 15, 2026

(54) SIDE STRUCTURE OF VEHICLE BODY

(71) Applicants: Hyundai Motor Company, Seoul (KR); Kia Corporation, Seoul (KR); AJIN Industrial CO., Ltd., Gyeongsan-si (KR)

(72) Inventors: Hoyeon Kim, Suwon-si (KR); Chulhee Heo, Hwaseong-si (KR); Seokju Gim, Seongnam-si (KR); Jeung Tae Kim, Daegu (KR)

(73) Assignees: Hyundai Motor Company, Seoul (KR); Kia Corporation, Seoul (KR); AJIN Industrial Co., Ltd., Gyeongsan-Si (KR)

(*) Notice: Subject to any disclaimer, the term of this patent is extended or adjusted under 35 U.S.C. 154(b) by 355 days.

(21) Appl. No.: 18/490,028

(22) Filed: Oct. 19, 2023

(65) Prior Publication Data

US 2024/0300583 A1 Sep. 12, 2024

(30) Foreign Application Priority Data

Mar. 7, 2023 (KR) ........................ 10-2023-0029953

(51) Int. Cl.
*B62D 25/02* (2006.01)
*B62D 25/04* (2006.01)

(52) U.S. Cl.
CPC ........... *B62D 25/025* (2013.01); *B62D 25/04* (2013.01)

(58) Field of Classification Search
CPC ............ B62D 25/02; B60J 5/04; B60J 5/0402
USPC ..................................................... 296/187.12
See application file for complete search history.

(56) References Cited

U.S. PATENT DOCUMENTS 3,591,231 A * 7/1971 Wessells ................ B62D 25/02 296/203.03
4,252,364 A * 2/1981 Toyama ............... B62D 25/025 296/203.01
4,328,642 A * 5/1982 Presto .................... B60J 5/0481 49/502
4,512,240 A * 4/1985 Mahler .................. B60J 5/0483 49/503
4,662,115 A * 5/1987 Ohya ..................... B60J 5/0481 49/502
4,711,052 A * 12/1987 Maeda ................... B60J 5/0415 49/502
4,827,671 A * 5/1989 Herringshaw ......... B60J 5/0416 49/502
4,843,762 A * 7/1989 Grier ...................... B60J 5/0405 49/378
4,845,894 A * 7/1989 Herringshaw ......... B60J 5/0416 296/146.7
4,894,954 A * 1/1990 Nozaki .................... B60J 10/74 49/441
5,095,659 A * 3/1992 Benoit ................... B60J 5/0416 292/DIG. 31
5,785,378 A * 7/1998 Seefried ................. B62D 25/02 296/203.03

(Continued)

*Primary Examiner* — Jason D Shanske
(74) *Attorney, Agent, or Firm* — Slater Matsil, LLP

(57) ABSTRACT

An embodiment side structure of a vehicle body includes a surround panel connected to an edge of a front side opening part disposed on a front side body, wherein a glass opening part is provided on an upper portion of the surround panel, a channel assembly connected to edges of the glass opening part, and a side outer panel connected to the front side body and the channel assembly.

20 Claims, 18 Drawing Sheets

(56) References Cited

U.S. PATENT DOCUMENTS

| | | | | |
|---|---|---|---|---|
| 5,857,732 | A * | 1/1999 | Ritchie | B60J 5/0433 49/502 |
| 9,016,747 | B2 * | 4/2015 | Kuroki | B60R 1/06 296/1.11 |
| 9,884,541 | B2 * | 2/2018 | Ide | B60J 10/36 |
| 10,864,806 | B2 * | 12/2020 | Jeon | B60J 5/0483 |
| 11,065,944 | B2 * | 7/2021 | Jeon | B60J 5/0406 |
| 11,465,471 | B2 * | 10/2022 | Jeon | B60J 5/0481 |
| 11,607,925 | B2 * | 3/2023 | Artmeier | B60H 1/00899 |
| 11,858,322 | B2 * | 1/2024 | Choi | B60J 5/0468 |
| 12,246,583 | B1 * | 3/2025 | Kingman | B60J 1/17 |
| 12,459,338 | B2 * | 11/2025 | Skorka | B60J 5/0455 |
| 2003/0102697 | A1 * | 6/2003 | Yakata | B62D 25/04 296/209 |
| 2007/0267889 | A1 * | 11/2007 | Flendrig | B60J 5/0416 296/202 |
| 2008/0084088 | A1 * | 4/2008 | Kubo | B29C 66/225 160/354 |
| 2009/0230650 | A1 * | 9/2009 | Mayen | B60G 7/001 280/124.1 |
| 2014/0054929 | A1 * | 2/2014 | Son | B62D 21/157 296/203.03 |
| 2014/0132029 | A1 * | 5/2014 | Kuroki | B60J 5/0451 296/1.11 |
| 2014/0319877 | A1 * | 10/2014 | Hida | B62D 25/02 296/193.06 |
| 2015/0266365 | A1 * | 9/2015 | Dosaki | B60J 10/75 49/484.1 |
| 2019/0176583 | A1 * | 6/2019 | Jeon | B60J 5/0456 |
| 2019/0176591 | A1 * | 6/2019 | Jeon | B60J 5/0483 |
| 2019/0184796 | A1 * | 6/2019 | Jeon | B60J 5/0402 |
| 2019/0193540 | A1 * | 6/2019 | Kunapareddy | B60J 10/75 |
| 2020/0238799 | A1 * | 7/2020 | Jeon | B60J 5/0463 |
| 2021/0206245 | A1 * | 7/2021 | Jeon | B60J 5/0484 |
| 2023/0166588 | A1 * | 6/2023 | Nojiri | B60J 10/50 49/489.1 |
| 2023/0264544 | A1 * | 8/2023 | Plourde, Jr. | B60J 5/0434 296/146.6 |

* cited by examiner

SIDE STRUCTURE OF VEHICLE BODY

CROSS-REFERENCE TO RELATED APPLICATIONS

This application claims the benefit of Korean Patent Application No. 10-2023-0029953, filed on Mar. 7, 2023, which application is hereby incorporated herein by reference.

TECHNICAL FIELD

The present invention relates to a vehicle body.

BACKGROUND

Recently, the vehicle industry is introducing a new concept of future mobility vision for realizing a human-centered, dynamic future city. One of these future mobility solutions is a purpose built vehicle (PBV) as a purpose-based mobility.

A PBV is an electric vehicle (EV) based environment-friendly vehicle that provides various customized services to users. The vehicle body of such a PBV is composed of an under body (also referred to as a rolling chassis or a skateboard in the art) and an upper body assembled to the under body.

Here, the upper body may be configured in various forms according to the type of customized service of the PBV. For example, the PBV has only one door for opening and closing the driver's seat in front of the upper body, and the vehicle body can be configured more economically by not applying a door to the passenger's seat.

However, even if a door is not applied to the front passenger seat, it is necessary to apply an elevating glass for occupant convenience.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle body. Particular embodiments relate to a side structure of a vehicle body applied to a Purpose Built Vehicle (PBV).

Embodiments of the present disclosure provide a side structure of a vehicle body applying elevating glass to an auxiliary seat to which a door is not applied.

A side structure of a vehicle body according to an exemplary embodiment may include a surround panel connected to an edge of a front side opening part formed on a front side body and having a glass opening part formed on an upper portion thereof, a channel assembly connected to an edge of the glass opening part, and a side outer panel connected to the front side body and the channel assembly.

The side structure of a vehicle body according to an exemplary embodiment may further include a regulator installed on a lower portion of the surround panel.

The front side body may include a front pillar, a center pillar, a side sill connecting lower portions of the front pillar and the center pillar, and a side upper reinforcement connecting upper portions of the front pillar and the center pillar.

The surround panel may include a glass support portion on which the glass opening part is formed and a regulator mounting portion connected to a lower portion of the glass support portion.

The glass support portion may include a first flange formed on an inner edge of the glass opening part and a second flange formed on an outer edge of the glass opening part.

The regulator mounting portion may include a third flange formed on an edge thereof.

The first flange may be connected to the channel assembly.

The second flange may be connected to a body portion formed on each of the front pillar, the center pillar, and the side upper reinforcement.

The third flange may be connected to an opening flange formed on the front pillar, the center pillar, and the side sill, respectively.

The channel assembly may include an inner belt rail connected to the lower edge of the glass opening part, a channel rail coupled to the remaining edge of the glass opening part, and an outer belt rail disposed parallel to the inner belt rail to form a glass passage between the inner belt rail and the outer belt rail connected with the channel rail.

The channel assembly may include an inner belt rail connected to the first flange along the lower edge of the glass opening part, a channel rail connected to the first flange along the remaining edge of the glass opening part, and an outer belt rail disposed parallel to the inner belt rail at a predetermined interval and connected to the channel rail.

The channel assembly may include a front mounting bracket connected to the first flange at the front of the surround panel and connecting the channel rail, the inner belt rail, and the outer belt rail, and a rear mounting bracket connected to the first flange at the rear of the surround panel and connecting the channel rail, the inner belt rail, and the outer belt rail.

A notch may be formed on the channel rail and the first flange, respectively, to connect the channel rail and the side outer panel.

The side outer panel may include a forming part bent in multiple steps on the front part of the side outer panel and connected with the front pillar.

The side outer panel may further include at least one drainage hole formed at a lower edge thereof.

The side structure of an exemplary embodiment may further include an extension reinforcement member connecting the front pillar and the center pillar.

In exemplary embodiments of the present invention, the elevating glass is applied to a front side body to which a door is not applied, and parts constituting the elevating glass may reinforce the strength of the front side body.

In addition, the effects that can be obtained or predicted due to the embodiments of the present invention will be directly or implicitly disclosed in the detailed description of the embodiments of the present invention. That is, various effects expected according to an embodiment of the present invention will be disclosed within the detailed description to be described later.

BRIEF DESCRIPTION OF THE DRAWINGS

Since these drawings are for reference in explaining exemplary embodiments of the present invention, the technical idea of the embodiments of the present invention should not be construed as being limited to the accompanying drawings.

Figure 1:
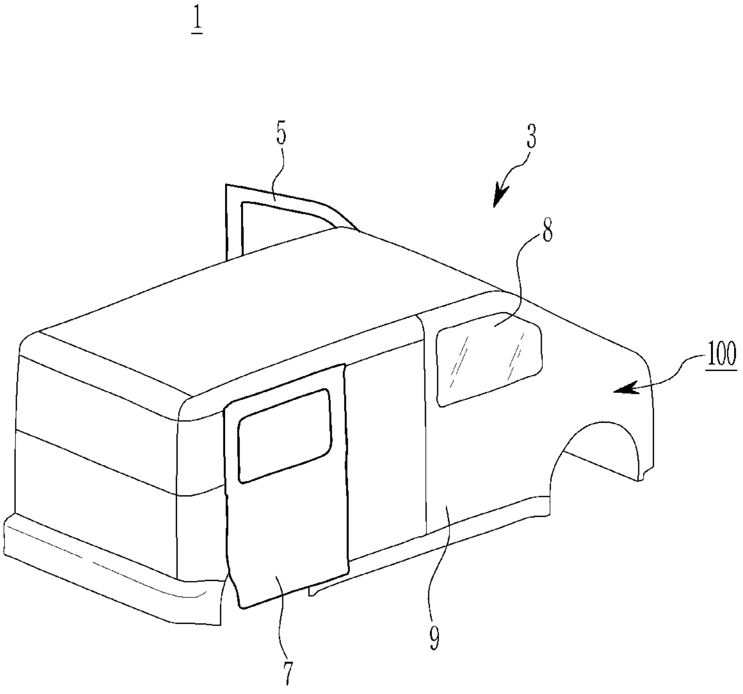
FIG. 1 is a perspective view of a vehicle body to which a side structure of a vehicle body according to an exemplary embodiment may be applied.

The following reference identifiers may be used in connection with the drawings to describe various features of embodiments of the present invention.

| | |
|---|---|
| 1: vehicle body | 3: upper body |
| 5: front door | 7: sliding door |
| 8: elevating glass | 9: auxiliary seat |
| 10: front side body | 11: front pillar |
| 13: center pillar | 13a: pillar outer member |
| 13b: pillar inner member | 15: side sill |
| 17: side upper reinforcement | 17a: upper outer member |
| 17b: upper inner member | 19: front side opening part |
| 21, 23, 25, 27: body portion | 22, 24, 26, 28: opening flange |
| 30: surround panel | 30a: glass opening part |
| 31: glass support portion | 33: first flange |
| 35: second flange | 41: regulator mounting portion |
| 43: third flange | 50: channel assembly |
| 51: inner belt rail | 53: channel rail |
| 55: outer belt rail | 57: front mounting bracket |
| 59: rear mounting bracket | 61: glass run |
| 63: glass passage | 70: regulator |
| 80: extension reinforcement member | 90: side outer panel |
| 91: notch | 93: forming part |
| 95: drainage hole | BL: belt line |
| 100: side structure of a vehicle body | |

The drawings referenced above are not necessarily drawn to scale, but should be understood as presenting rather simplified representations of various preferred features illustrating the basic principles of embodiments of the present invention. For example, specific design features of embodiments of the present invention, including specific dimensions, directions, positions, and shapes, will be determined in part by specific intended applications and use environments.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the embodiments of the present invention.

The terminology used herein is for the purpose of describing specific exemplary embodiments only and is not intended to limit the embodiments of the present disclosure. As used herein, the singular forms are intended to include the plural forms as well, unless the context clearly indicates otherwise.

The terms 'comprises' and/or 'comprising' as used herein indicate the presence of specified features, integers, steps, operations, elements and/or components, but they do not exclude the presence or addition of one or more other features, integers, steps, operations, components, and/or groups thereof.

As used in this specification, the term 'and/or' includes any one or all combinations of at least one of the associated listed items.

In this specification, the term 'connected' indicates a physical relationship between two components, for example, in which components are directly connected to each other by welding, self piercing rivet (SPR), flow drill screw (FDS), structural adhesive, or the like, or in which components are indirectly connected through one or more intermediate components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (purpose built vehicles), hydrogen-powered vehicles, and other alternative fuel vehicles (e.g., other than petroleum fuel derived from resources).

Hereinafter, embodiments of the present invention will be described in detail with reference to the accompanying drawings.

FIG. 1 is a perspective view of a vehicle body to which a side structure of a vehicle body according to an exemplary embodiment may be applied.

Referring to FIG. 1, a side structure 100 of a vehicle body 1 according to an exemplary embodiment may be applied to, for example, the vehicle body 1 of a purpose-based mobility vehicle (purpose built vehicle: hereinafter referred to as 'PBV').

In one example, the PBV may be used as an electric vehicle-based life module vehicle that provides various services to occupants while moving from a starting point to a destination in an unmanned self-driving manner. The life module vehicle described above is also referred to by a person of an ordinary skill in the art as a 'robo taxi', a 'robo shuttle', or a 'hailing vehicle'.

In one example, the PBV may be manufactured with a one box type design having a large interior space. In addition, the PBV may apply a facing type seat to provide a wide interior space.

The vehicle body of the PBV includes a skateboard type under body (commonly referred to as a 'rolling chassis' or 'chassis frame' by those skilled in the art) and an upper body 3 assembled to the under body.

The under body may be equipped with a battery assembly and a drive motor (not shown). The upper body 3 is a BIW (body in white) body connected to the under body and may constitute a cabin with a wide indoor space.

In this specification, the 'front to rear direction of the vehicle body' may be defined as the longitudinal direction of the vehicle body, the 'vehicle width direction' may be defined as the left-right direction of the vehicle body, and the 'up-and-down direction' may be defined as the height direction of the vehicle body.

Furthermore, in this specification, 'upper end', 'upper portion', or 'upper surface' of a component indicates an end, portion, or surface of a component that is relatively upper in the drawing, and 'lower end', 'lower portion', or 'lower surface' of a component indicates an end, portion, or surface of a component that is relatively lower in the drawing.

Furthermore, in this specification, an end of a component (e.g., one end or another (other) end, etc.) denotes an end of a component in any one direction, and an end portion of the component (e.g., one end portion) or other (another) end portion, etc.) denotes a portion of a component that includes that end.

As described above, the upper body 3 may include a front door 5 mounted on one side along the vehicle width direction and a sliding door 7 mounted on the other side along the vehicle width direction.

The side structure 100 of the vehicle body 1 according to an exemplary embodiment may be a doorless side structure 100 without a door in front of the sliding door 7, that is, at an auxiliary seat 9, on the other side of the upper body 3.

In the side structure 100 of the vehicle body 1 according to such an exemplary embodiment, the side of the front auxiliary seat 9 does not have a door, but it is necessary to apply an elevating glass 8 for occupant convenience.

The side structure 100 of the vehicle body according to an exemplary embodiment is provided with a structure in which the elevating glass 8 is applied to the auxiliary seat 9 to which a door is not applied.

Figure 2:
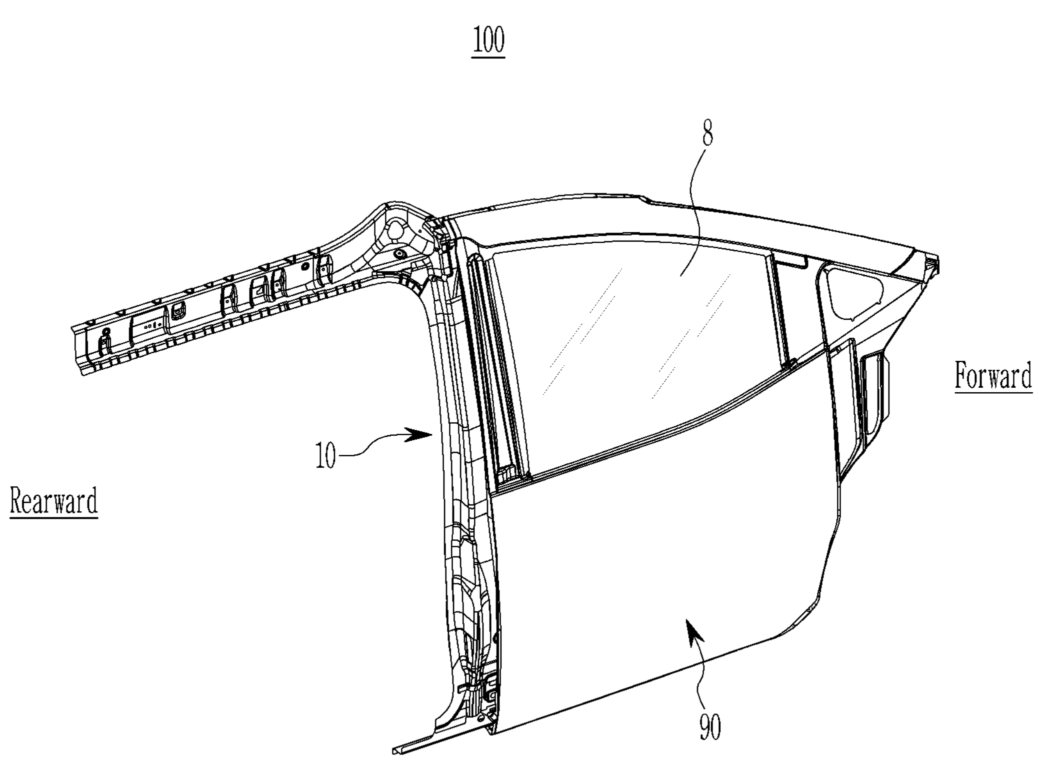
FIG. 2 is a perspective view showing the side structure of a vehicle body according to an exemplary embodiment.
Figure 3:
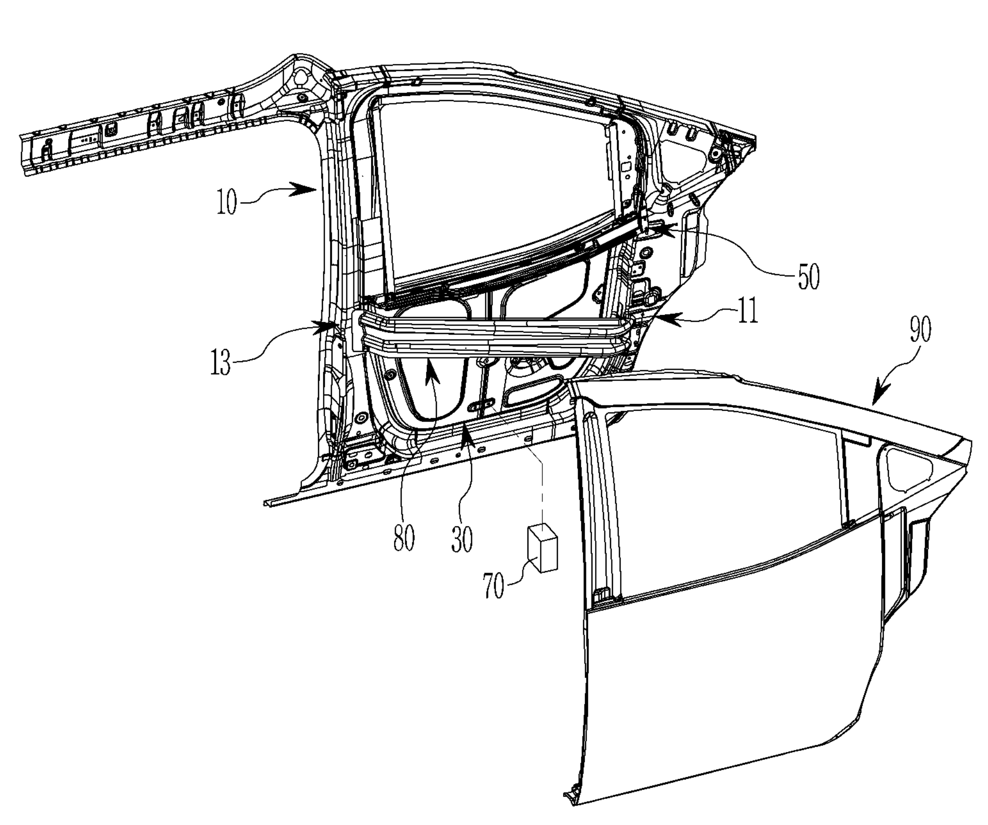
FIG. 3 and FIG. 4 are exploded perspective views showing the side structure of a vehicle body according to an exemplary embodiment.
Figure 4:
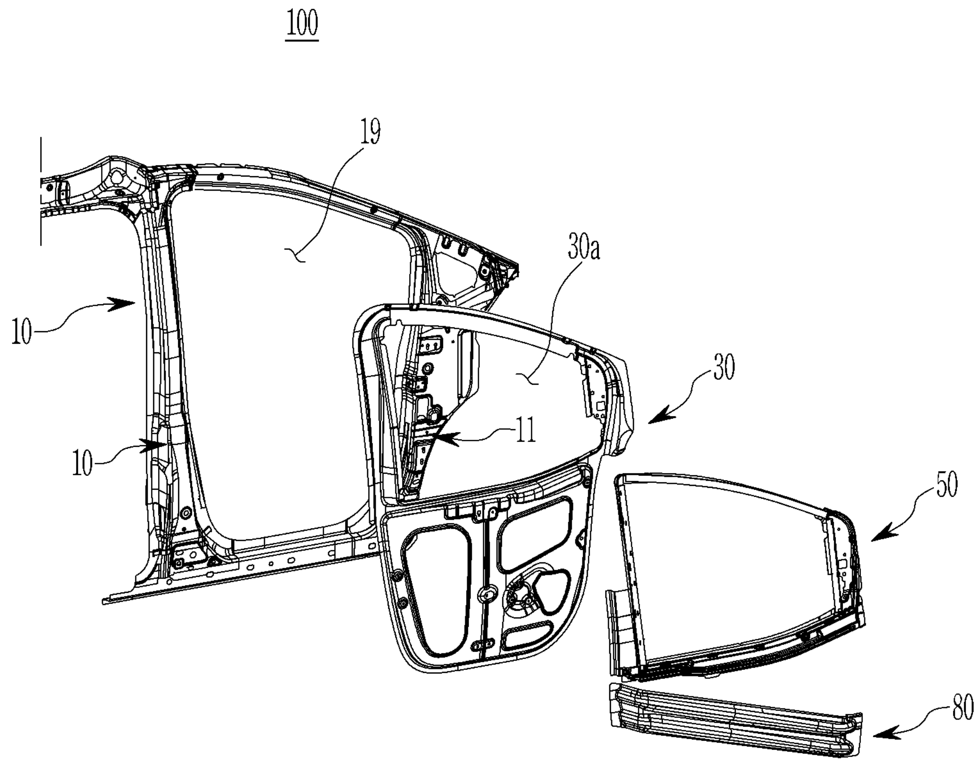

FIG. 2 is a perspective view showing the side structure of a vehicle body according to an exemplary embodiment, and FIG. 3 and FIG. 4 are exploded perspective views showing the side structure of a vehicle body according to an exemplary embodiment.

Figure 5:
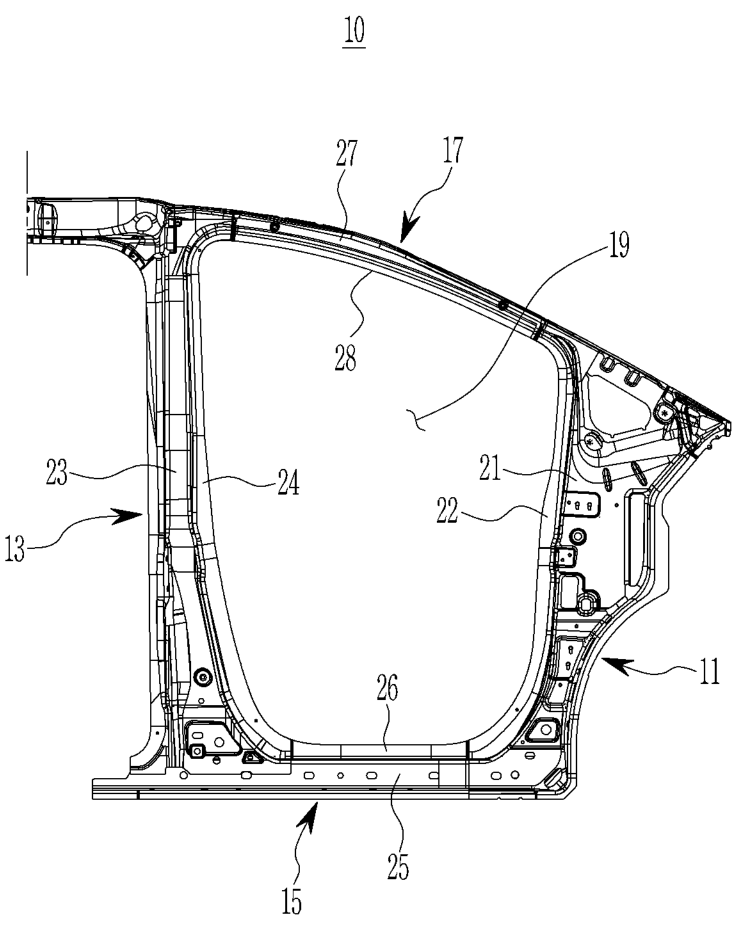
FIG. 5 is a side view showing a front side body applied to a side structure of a vehicle body according to an exemplary embodiment.

FIG. 5 is a side view showing a front side body applied to a side structure of a vehicle body according to an exemplary embodiment.

Referring to FIG. 2 to FIG. 5, the side structure 100 of the vehicle body 1 according to an exemplary embodiment includes a front side body 10, a surround panel 30, a channel assembly 50, a regulator 70, an extension reinforcement member 80, and a side outer panel 90.

In an exemplary embodiment, the front side body 10 may be a side frame of the auxiliary seat 9 without a door.

This front side body 10 includes, as shown in FIG. 5, a front pillar 11, a center pillar 13, a side sill 15, and a side upper reinforcement 17.

The front pillar 11 and the center pillar 13 are disposed along the vertical direction at predetermined intervals along the front to rear direction of the vehicle body. Here, between the front pillar 11 and the center pillar 13, the elevating glass 8 may be disposed.

The side sill 15 connects lower portions of the front pillar 11 and the center pillar 13 along the front to rear direction of the vehicle body. The side upper reinforcement 17 connects upper portions of the front pillar 11 and the center pillar 13 along the front to rear direction of the vehicle body.

Each of the front pillar 11, the center pillar 13, the side sill 15, and the side upper reinforcement 17 includes a body portion 21, 23, 25, and 27.

The front side body 10 includes a front side opening part 19. The front side opening part 19 may be formed by the front pillar 11, the center pillar 13, the side sill 15, and the side upper reinforcement 17 connected to each other.

An opening flange 22, 24, 26, and 28 is formed at each edge of the front side opening part 19. Each of the opening flanges 22, 24, 26, and 28 extends from each body portion 21, 23, 25, and 27 of the front pillar 11, the center pillar 13, the side sill 15, and the side upper reinforcement 17.

Referring to FIG. 3 and FIG. 4, in an exemplary embodiment, the surround panel 30 is configured to secure the connection strength of the front side body 10. The surround panel 30 is configured to mount the channel assembly 50, which will be described further later, on the front side body 10.

The surround panel 30 divides the inside and outside of the upper body through the front side opening part 19 of the front side body 10. In addition, the surround panel 30 blocks the inflow of material or water into the interior of the upper body 3 through the front side opening part 19.

In one example, the surround panel 30 may be formed of a steel material. The surround panel 30 may be connected to the edge of the front side opening part 19. The surround panel 30 includes a glass opening part 30*a* formed in an upper portion thereof.

Figure 6:
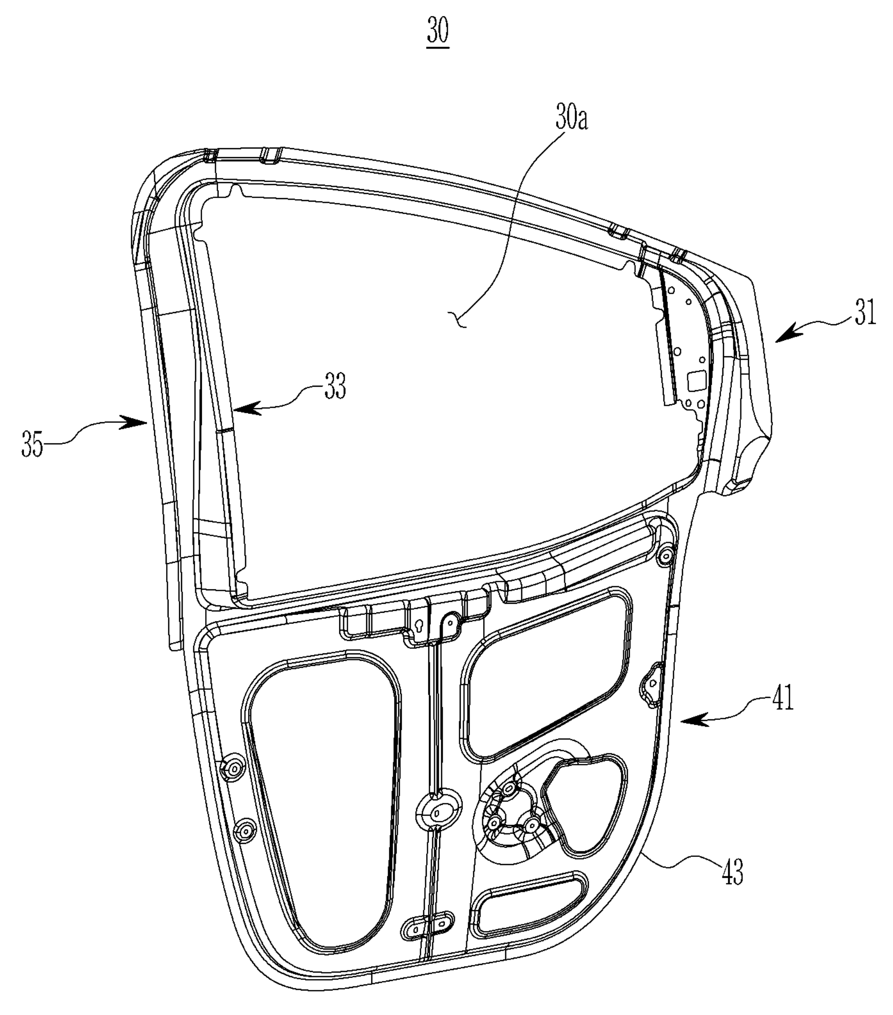
FIG. 6 is a perspective view showing a surround panel applied to a side structure of a vehicle body according to an exemplary embodiment.

FIG. 6 is a perspective view showing a surround panel applied to a side structure of a vehicle body according to an exemplary embodiment.

Referring to FIG. 6, the surround panel 30 according to an embodiment of the present invention includes a glass support portion 31 and a regulator mounting portion 41.

The glass support portion 31 may be formed on an upper portion of the surround panel 30. The regulator mounting portion 41 may be formed on a lower portion of the surround panel 30.

The glass support portion 31 is configured to support the elevating glass 8. The glass support portion 31 includes the glass opening part 30*a*. In addition, the glass support portion 31 further includes a first flange 33 and a second flange 35.

The first flange 33 is formed on an inner edge of the glass opening part 30*a*. The second flange 35 is formed on an outer edge of the glass opening part 30*a* and is connected to the first flange 33.

The regulator mounting portion 41 is configured to mount the regulator 70 (see FIG. 3) to be described later on the surround panel 30. The regulator mounting portion 41 is provided in a plate type and is connected to a lower portion of the glass support portion 31.

The regulator mounting portion 41 includes a third flange 43 formed on an edge (e.g., a plate edge) thereof.

The first flange 33 may be connected with the channel assembly 50 (see FIG. 3 and FIG. 4) which will be further described later. For example, the first flange 33 may be connected to the channel assembly 50 by welding.

The second flange 35 may be connected to body portions 21, 23, and 27 respectively formed on the front pillar 11, the center pillar 13, and the side upper reinforcement 17 of the front side body 10. For example, the second flange 35 may be welded to each of the body portions 21, 23, and 27.

Figure 7:
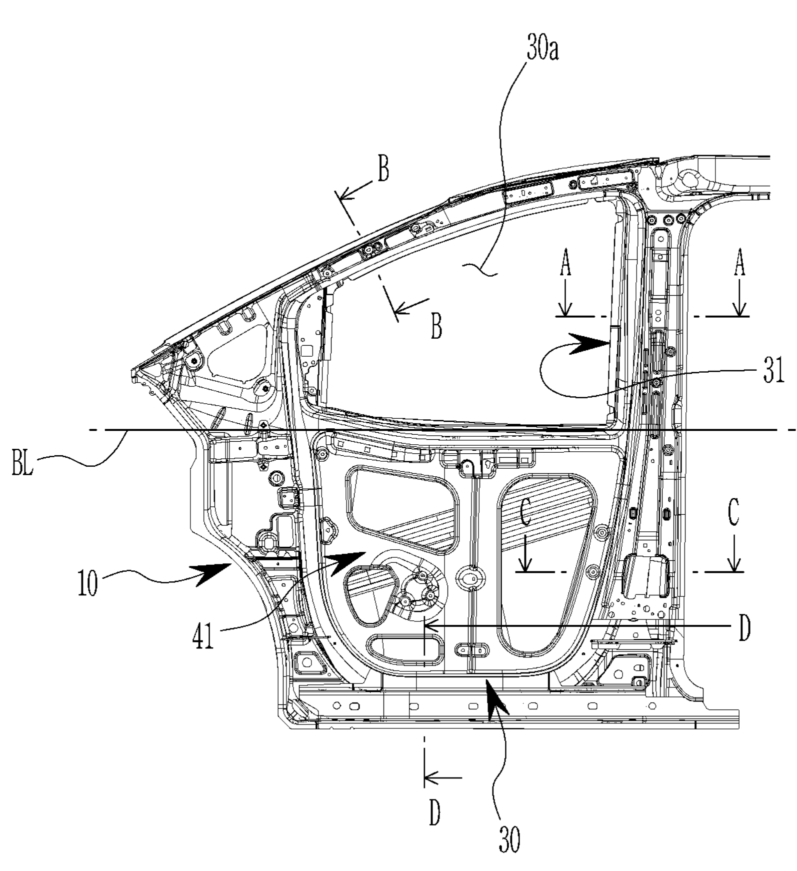
FIG. 7 is a side view of a front side body of a vehicle body according to an exemplary embodiment.
Figure 8:
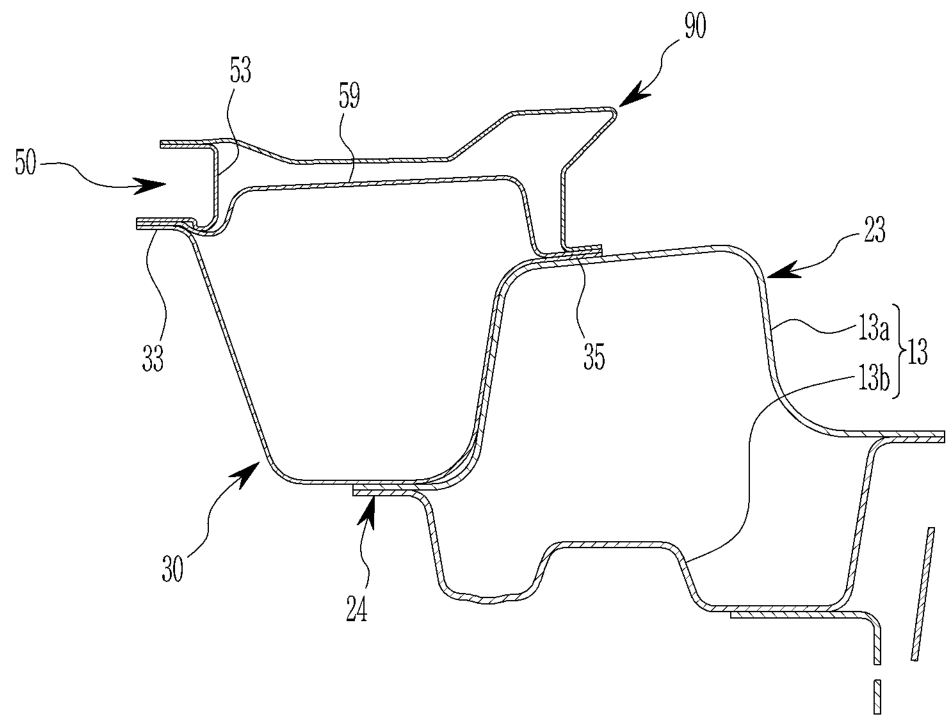
FIG. 8 is a cross-sectional view along line A-A of FIG. 7.

FIG. 7 is a side view of a front side body of a vehicle body according to an exemplary embodiment, and FIG. 8 is a cross-sectional view along line A-A of FIG. 7.

Figure 9:
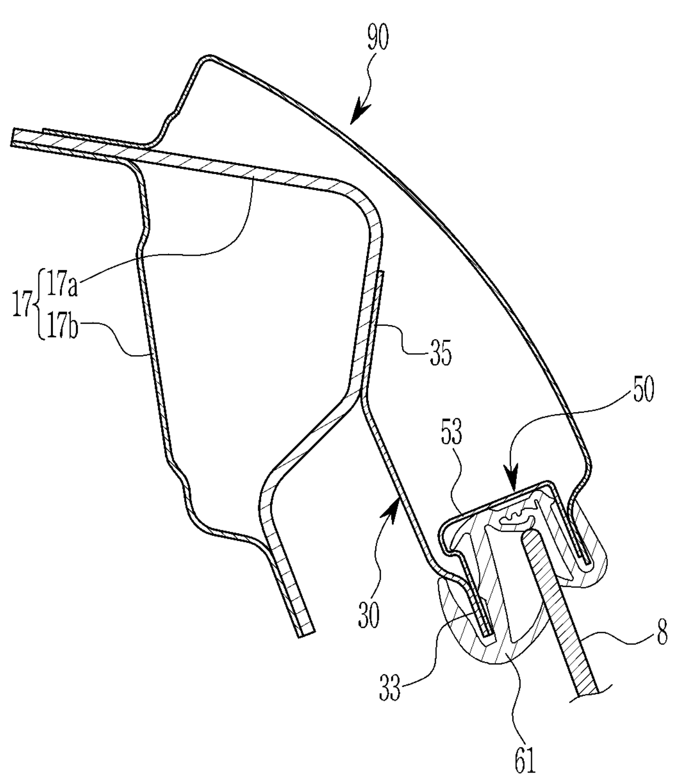
FIG. 9 is a cross-sectional view along line B-B of FIG. 7.
Figure 10:
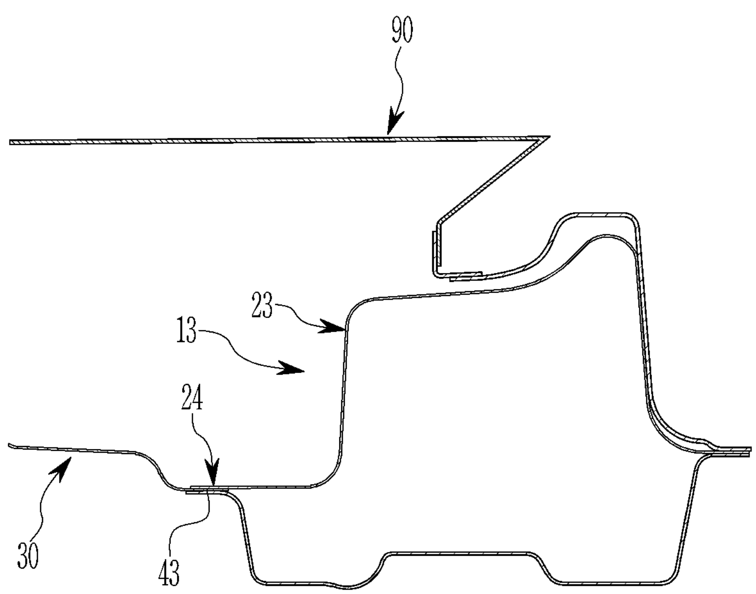
FIG. 10 is a cross-sectional view along line C-C of FIG. 7.
Figure 11:
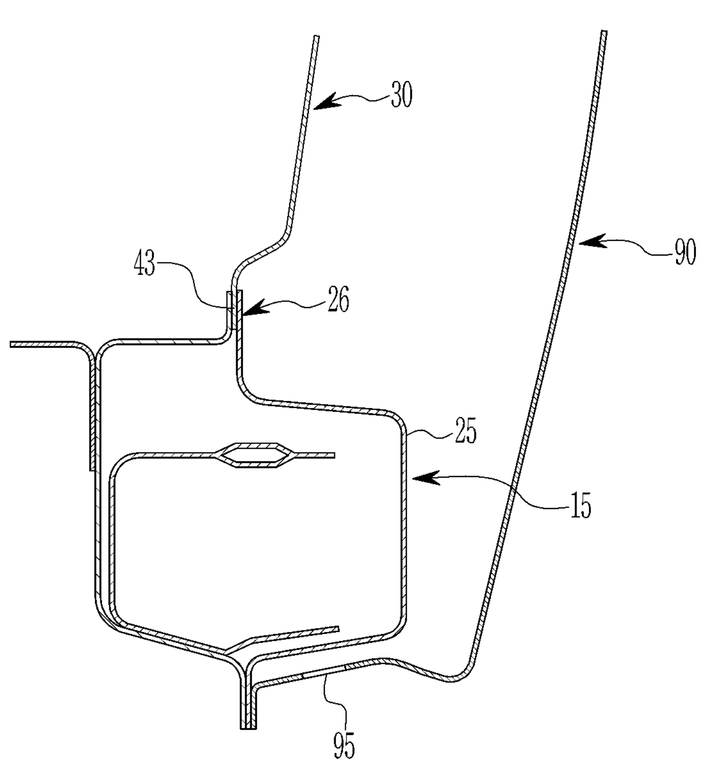
FIG. 11 is a cross-sectional view along line D-D of FIG. 7.

FIG. 9 is a cross-sectional view along line B-B of FIG. 7, FIG. 10 is a cross-sectional view along line C-C of FIG. 7, and FIG. 11 is a cross-sectional view along line D-D of FIG. 7.

In one example, the surround panel 30, as shown in FIG. 8, is connected to the opening flange 24 of the center pillar 13 and may be connected to the body portion 23 of the center pillar 13 through the second flange 35.

The center pillar 13 may include a center pillar outer member 13*a* and a center pillar inner member 13*b* connected to each other, and the second flange 35 may be connected to the center pillar outer member 13*a*.

As shown in FIG. 9, the side upper reinforcement 17 may include a side upper outer member 17*a* and a side upper inner member 17*b* connected to each other, and the second flange 35 may be connected to the side upper outer member 17*a*.

In addition, the third flange 43 is connected to the opening flanges 22, 24, and 26 formed on the front pillar 11, the center pillar 13, and the side sill 15 of the front side body 10, respectively. For example, the third flange 43 may be welded to each of the opening flanges 22, 24, and 26.

In one example, the third flange 43, as shown in FIG. 10, may be connected to the opening flange 24 extending from the body portion 23 of the center pillar 13. In another example, the third flange 43, as shown in FIG. 11, may be connected to the opening flange 26 extending from the body portion 25 of the side sill 15.

The surround panel 30 is connected to each of the body portions 21, 23, and 27 of the front pillar 11, the center pillar 13, and the side upper reinforcement 17 through the second flange 35, and the connection strength of the front side body 10 may be increased.

In addition, the surround panel 30 is connected to each of the opening flanges 22, 24, and 26 of the front pillar 11, the center pillar 13, and the side sill 15 through the third flange 43, and the side strength and sealing performance of the front side body 10 may be improved.

Referring to FIG. 3 and FIG. 4, in an exemplary embodiment, the channel assembly 50 supports the elevating glass 8 and is configured to guide the vertical movement of the elevating glass 8.

The channel assembly 50 is connected to an inner edge of the glass opening part 30*a* of the surround panel 30. That is, the channel assembly 50 may be connected to the first flange 33, shown in FIG. 6 and FIG. 7, of the glass support portion 31.

Figure 12:
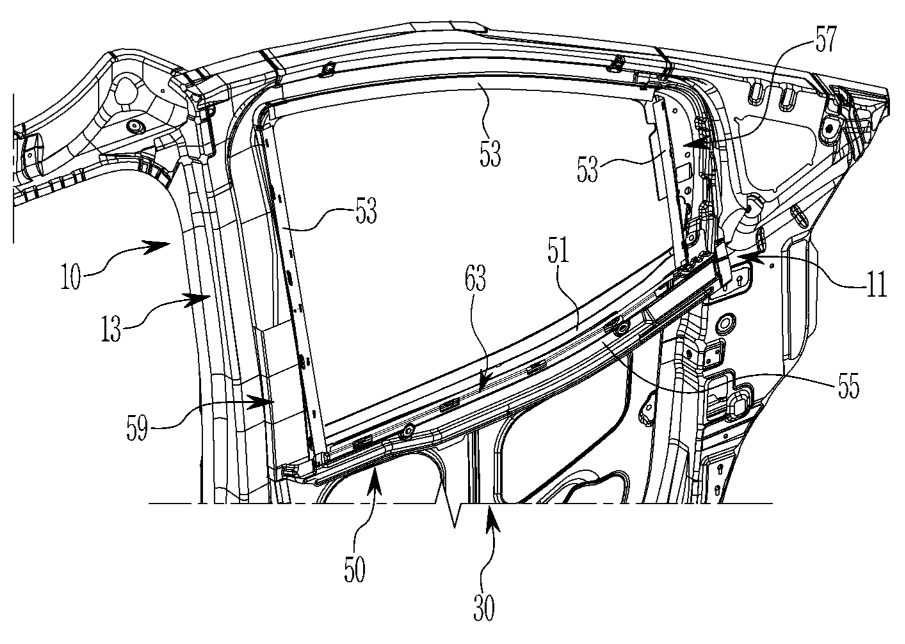
FIG. 12 is a perspective view showing a channel assembly applied to the side structure of a vehicle body according to an exemplary embodiment.
Figure 13:
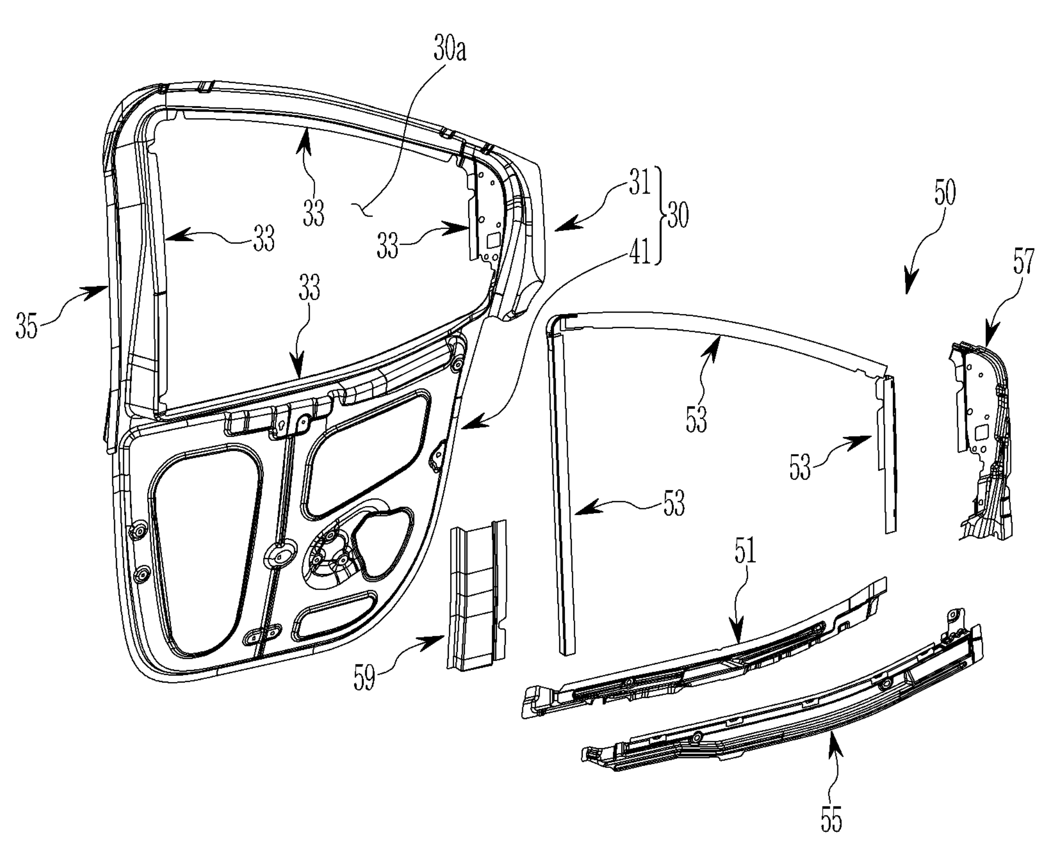
FIG. 13 is an exploded perspective view showing the channel assembly applied to the side structure of the vehicle body according to an exemplary embodiment.

FIG. 12 is a perspective view showing a channel assembly applied to the side structure of the vehicle body according to an exemplary embodiment, and FIG. 13 is an exploded perspective view showing the channel assembly applied to the side structure of the vehicle body according to an exemplary embodiment.

Referring to FIG. 12 and FIG. 13, the channel assembly 50 according to an exemplary embodiment includes an inner belt rail 51, a channel rail 53, an outer belt rail 55, a front mounting bracket 57, and a rear mounting bracket 59.

The inner belt rail 51 is connected to a lower edge of the glass opening part 30*a* of the surround panel 30 along the front to rear direction of the vehicle body. For example, the inner belt rail 51 may be welded to the first flange 33 along the lower edge of the glass opening part 30*a*.

The channel rail 53 is connected to the inner belt rail 51 and to the remaining edge of the glass opening part 30*a*. For example, the channel rail 53 may be welded to the first flange 33 along the remaining edge of the glass opening part 30*a*.

In one example, the channel rail 53 may have a cross-section shape of 'U'. A glass run 61 of sealing material (see FIG. 9) may be mounted on the channel rail 53. The glass run 61 supports the elevating glass 8 with elasticity and may block external materials and water from inflowing into the vehicle.

The outer belt rail 55 is configured to form a glass passage 63 between the inner belt rail 51 and the outer belt rail 55. The outer belt rail 55 is disposed along the front and rear direction of the vehicle body parallel to the inner belt rail 51 and is connected with the channel rail 53.

The inner belt rail 51 and the outer belt rail 55, as shown in FIG. 7, may form a belt line BL on the lower side of the glass opening part 30*a* of the surround panel 30 along the front to rear direction of the vehicle body.

Based on the belt line BL, the glass support portion 31 of the surround panel 30 may be formed on the upper side of the belt line BL, and the regulator mounting portion 41 of the surround panel 30 may be formed on the lower side of the belt line BL.

The front mounting bracket 57 connects the inner belt rail 51, the channel rail 53, and the outer belt rail 55 at the front of the surround panel 30. The front mounting bracket 57 may be welded to the first flange 33 at the front of the surround panel 30.

The rear mounting bracket 59 connects the inner belt rail 51, the channel rail 53, and the outer belt rail 55 at the rear of the surround panel 30.

The rear mounting bracket 59 may be welded to the first flange 33, the second flange 35, and the center pillar 13 at the rear of the surround panel 30.

The inner belt rail 51 and the outer belt rail 55 may connect the front pillar 11 and the center pillar 13 along the belt line BL through the front mounting bracket 57 and the rear mounting bracket 59.

The inner belt rail 51 and the outer belt rail 55 connect the front pillar 11 and the center pillar 13 to increase the lateral strength of the front side body 10. That is, the inner belt rail 51 and the outer belt rail 55 are disposed along the front and rear direction of the vehicle body to increase the strength of the connection between the front pillar 11 and the center pillar 13 and to improve the side crash performance of the vehicle.

Furthermore, a plastic or rubber belt molding (not shown) supporting the elevating glass 8 (see FIG. 2) may be mounted in the glass passage 63 between the inner belt rail 51 and the outer belt rail 55.

Referring to FIG. 3, in an exemplary embodiment, the regulator 70 is configured to move the elevating glass 8 in a vertical direction. The regulator 70 is installed on the lower portion of the surround panel 30.

The regulator 70, as shown in FIG. 6 and FIG. 7, may be mounted on the regulator mounting portion 41 of the surround panel 30. The regulator 70 is mounted on the regulator mounting portion 41 of the surround panel 30 to reduce the number of parts.

Referring to FIG. 3 and FIG. 4, in an exemplary embodiment, the extension reinforcement member 80 connects the front pillar 11 and the center pillar 13 of the front side body 10 and is configured to reinforce the lateral strength of the front side body 10. Also, the extension reinforcement member 80 is configured to support the inner surface of the side outer panel 90, which will be further described later.

The extension reinforcement member 80 is disposed along the front to rear direction of the vehicle body and may be connected to the front pillar 11 and the center pillar 13 by welding.

Referring to FIG. 2 and FIG. 3, in an exemplary embodiment, the side outer panel 90 is coupled to the front side body 10 and the channel assembly 50.

In one example, the side outer panel 90 may be bonded to the front side body 10 and the channel assembly 50 by adhesive and welding. In another example, the side outer panel 90 may be formed of a metal or non-metal material.

Figure 14:
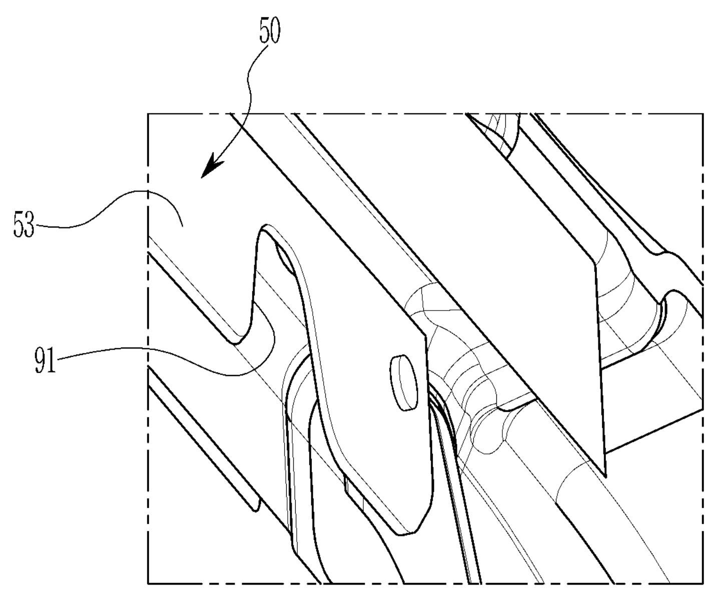
FIG. 14 and FIG. 15 are drawings showing a notch applied to the side structure of a vehicle body according to an exemplary embodiment.
Figure 15:
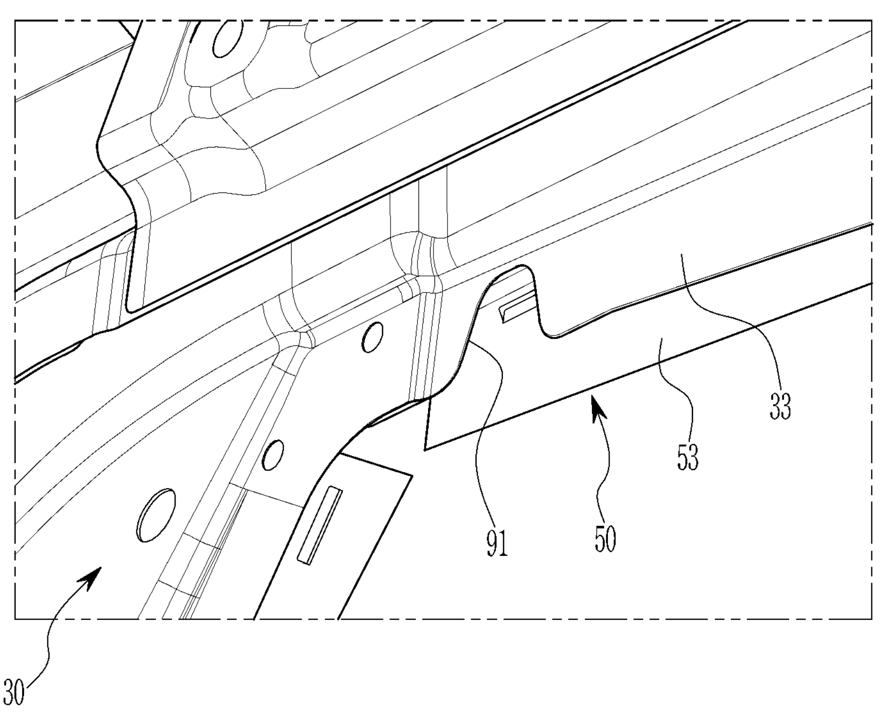

FIG. 14 and FIG. 15 are drawings showing a notch applied to the side structure of a vehicle body according to an exemplary embodiment.

The side outer panel 90 may be coupled to the channel assembly 50 by welding. As shown in FIG. 14 and FIG. 15, a notch 91 is formed on the channel rail 53 and the first flange 33, respectively, so that the channel rail 53 of the channel assembly 50 and the side outer panel 90 (see FIG. 2 and FIG. 3) may be joined by welding.

The notches 91 allow movement of a welding tip (not shown) for welding the channel rail 53 and the side outer panel 90.

Figure 16:
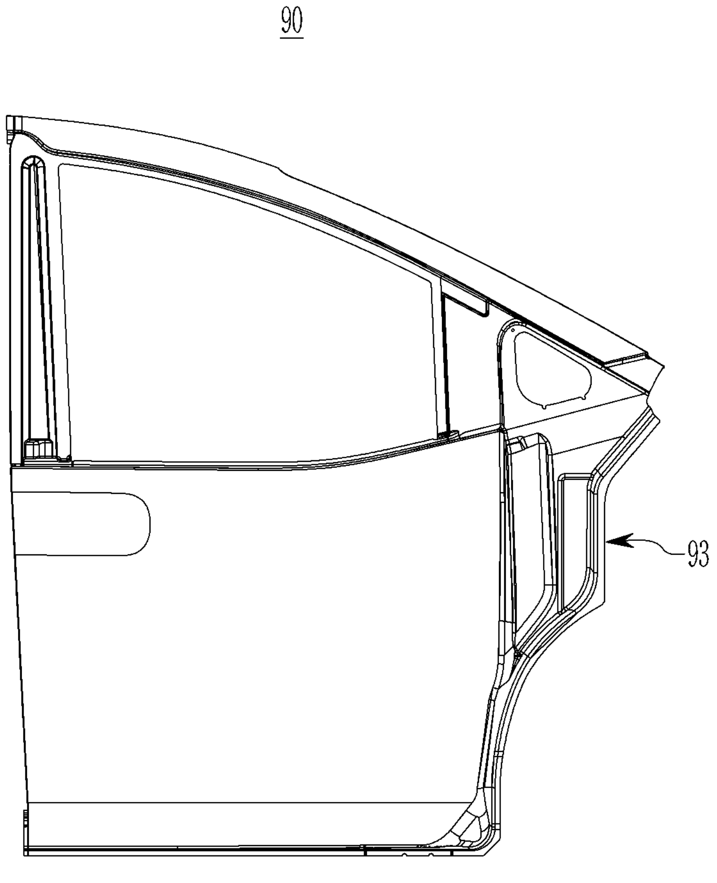
FIG. 16 to FIG. 18 are drawings showing a side outer panel applied to the side structure of a vehicle body according to an exemplary embodiment.
Figure 17:
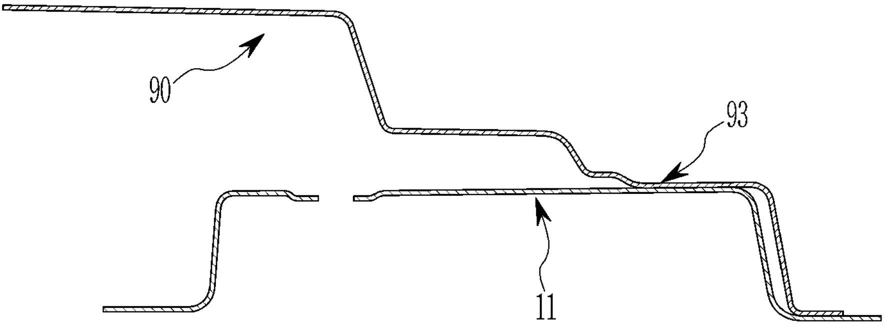
Figure 18:
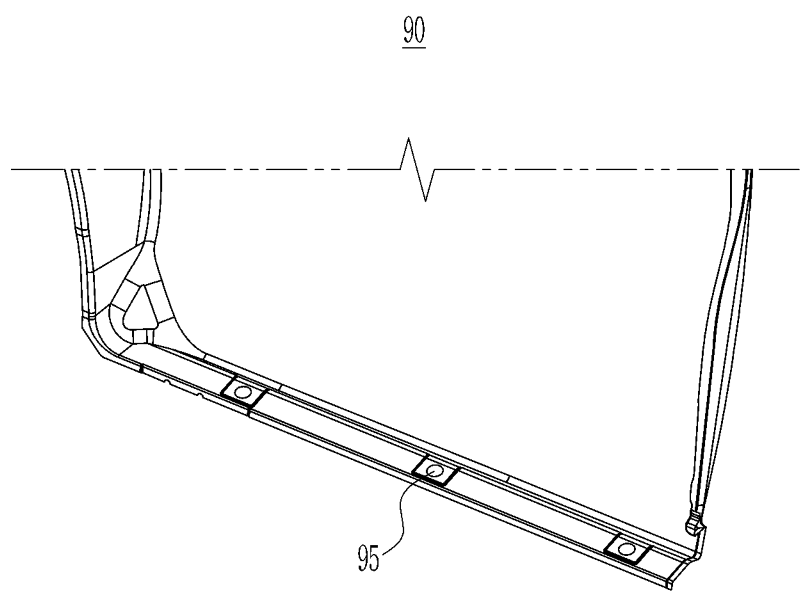

FIG. 16 to FIG. 18 are drawings showing a side outer panel applied to the side structure of a vehicle body according to an exemplary embodiment.

As shown in FIGS. 16 and 17, the side outer panel 90 further includes a forming part 93. The forming part 93 is bent in multiple steps on the front part of the side outer panel 90 and may be connected with the front pillar 11 by welding.

The forming part 93 may be bent in multiple stages from the outer surface of the side outer panel 90 toward the inner surface.

As the forming part 93 is formed on the front part of the side outer panel 90, deterioration in formability of the panel skin area may be prevented during molding of the side outer panel 90.

As shown in FIGS. 11 and 18, the side outer panel 90 further includes at least one drainage hole 95 formed at a lower edge thereof.

The drainage hole 95 is configured to exhaust water inflow between the surround panel 30 and the side outer panel 90. In one example, the at least one drainage hole 95 may be formed in plurality at predetermined intervals along the front and rear direction of the vehicle body at the lower edge of the side outer panel 90.

A one-way plug (not shown) may be mounted in the drainage holes 95. The one-way plug has a structure that allows water to flow in one direction and prevents water from flowing in the opposite direction.

The at least one drainage hole 95 exhausts the water inflow between the surround panel 30 and the side outer panel 90 to the outside to prevent water from flowing into the interior of the upper body 3.

According to the side structure 100 of the vehicle body 1 according to an exemplary embodiment as described so far, the elevating glass 8 may be applied to the front side body 10 to which a door is not applied through the surround panel 30 and the channel assembly 50.

In addition, according to the side structure 100 of the vehicle body 1 according to an exemplary embodiment, the surround panel 30 and the channel assembly 50 for mounting the elevating glass 8 may reinforce the strength of the front side body 10.

Furthermore, according to the side structure 100 of the vehicle body 1 according to an exemplary embodiment, the surround panel 30 and the channel assembly 50 may form a load path connecting the front pillar 11 and the center pillar 13 of the front side body 10. Accordingly, according to the side structure 100 of the vehicle body 1 according to an exemplary embodiment, it is easy to distribute the load during a collision of the vehicle.

Furthermore, according to the side structure 100 of the vehicle body 1 according to an exemplary embodiment, as the elevating glass 8 is applied to the front side body 10 to which the door is not applied, the convenience of the occupant may be promoted and a cargo loading space may be configured in the front part of the vehicle.

In addition, according to the side structure 100 of the vehicle body 1 according to an exemplary embodiment, since a door is not applied to the front side body 10, the assemblability and workability of the vehicle body may be improved, and the optimal space that meets the needs of the occupant may be secured.

While this invention has been described in connection with what is presently considered to be practical exemplary embodiments, it is to be understood that the embodiments of the invention are not limited to the disclosed embodiments. On the contrary, they are intended to cover various modifications and equivalent arrangements included within the spirit and scope of the appended claims.

What is claimed is:

1. A side structure of a vehicle body, the side structure comprising:

- a front side body comprising a front pillar, a center pillar, a side sill connecting lower portions of the front pillar and the center pillar, and a side upper reinforcement connecting upper portions of the front pillar and the center pillar;
- a front side opening part disposed on the front side body;
- a surround panel connected to an edge of the front side opening part, the surround panel comprising a glass opening part on an upper portion thereof, a glass support portion on which the glass opening part is provided, and a regulator mounting portion connected to a lower portion of the glass support portion, wherein the glass support portion comprises a first flange disposed on an inner edge of the glass opening part and a second flange disposed on an outer edge of the glass opening part and the regulator mounting portion comprises a third flange disposed on an edge of the regulator mounting portion;
- a channel assembly connected to edges of the glass opening part, wherein the first flange is connected to the channel assembly, the second flange is connected to a body portion disposed on each of the front pillar, the center pillar, and the side upper reinforcement, and the third flange is connected to an opening flange disposed on the front pillar, the center pillar, and the side sill, respectively; and
- a side outer panel connected to the front side body and the channel assembly.

2. The side structure of claim 1, further comprising a regulator disposed on the regulator mounting portion.

3. The side structure of claim 1, wherein the side outer panel comprises a forming part bent in multiple steps on a front part of the side outer panel and connected with the front pillar.

4. The side structure of claim 3, wherein the side outer panel further comprises a drainage hole disposed at a lower edge of the side outer panel.

5. The side structure of claim 1, further comprising an extension reinforcement member connecting the front pillar and the center pillar.

6. The side structure of claim 1, wherein the channel assembly comprises:

an inner belt rail connected to a lower edge of the glass opening part;

a channel rail coupled to side and upper edges of the glass opening part; and an outer belt rail connected with the channel rail and disposed parallel to the inner belt rail to define a glass passage between the inner belt rail and the outer belt rail.

7. The side structure of claim 1, wherein the channel assembly comprises:

an inner belt rail connected to the first flange along a lower edge of the glass opening part;

a channel rail connected to the first flange along side and upper edges of the glass opening part; and an outer belt rail connected to the channel rail and disposed parallel to the inner belt rail at a predetermined interval.

8. The side structure of claim 7, wherein the channel assembly comprises:

a front mounting bracket connected to the first flange at a front of the surround panel and connecting the channel rail, the inner belt rail, and the outer belt rail; and a rear mounting bracket connected to the first flange at a rear of the surround panel and connecting the channel rail, the inner belt rail, and the outer belt rail.

9. The side structure of claim 7, further comprising a notch disposed on the channel rail and the first flange, respectively, and configured to connect the channel rail and the side outer panel.

10. A vehicle comprising:

a vehicle body comprising a front side body comprising a front pillar, a center pillar, a side sill connecting lower portions of the front pillar and the center pillar, and a side upper reinforcement connecting upper portions of the front pillar and the center pillar;

a front side opening part disposed on the front side body;

a surround panel connected to an edge of the front side opening part, the surround panel comprising a glass opening part on an upper portion thereof;

a channel assembly connected to edges of the glass opening part; and a side outer panel connected to the front side body and the channel assembly, wherein a drainage hole is disposed at a lower edge of the side outer panel;

wherein the surround panel comprises a glass support portion on which the glass opening part is provided and a regulator mounting portion connected to a lower portion of the glass support portion;

wherein the glass support portion comprises a first flange disposed on an inner edge of the glass opening part and a second flange disposed on an outer edge of the glass opening part;

wherein the regulator mounting portion comprises a third flange disposed on an edge of the regulator mounting portion;

wherein the first flange is connected to the channel assembly;

wherein the second flange is connected to a body portion disposed on each of the front pillar, the center pillar, and the side upper reinforcement; and wherein the third flange is connected to an opening flange disposed on the front pillar, the center pillar, and the side sill, respectively.

11. The vehicle of claim 10, wherein the channel assembly comprises:

an inner belt rail connected to the first flange along a lower edge of the glass opening part;

a channel rail connected to the first flange along side and upper edges of the glass opening part; and an outer belt rail connected to the channel rail and disposed parallel to the inner belt rail at a predetermined interval.

12. The vehicle of claim 11, wherein the channel assembly comprises:

a front mounting bracket connected to the first flange at a front of the surround panel and connecting the channel rail, the inner belt rail, and the outer belt rail; and a rear mounting bracket connected to the first flange at a rear of the surround panel and connecting the channel rail, the inner belt rail, and the outer belt rail.

13. A side structure of a vehicle body for a doorless passenger seat area, the side structure comprising:

a front side body comprising a front pillar, a center pillar, a side sill connecting lower portions of the front pillar and the center pillar, and a side upper reinforcement connecting upper portions of the front pillar and the center pillar;

a front side opening part disposed on the front side body, wherein the front side opening part is not configured to receive a door;

a surround panel connected to an edge of the front side opening part, the surround panel comprising:

a glass opening part on an upper portion of the surround panel, the glass opening part configured to receive elevating glass for the passenger seat area;

a glass support portion on which the glass opening part is provided; and a regulator mounting portion connected to a lower portion of the glass support portion and configured to mount a window regulator for moving the elevating glass;

a channel assembly connected to edges of the glass opening part and configured to guide movement of the elevating glass; and a side outer panel connected to the front side body and the channel assembly.

14. The side structure of claim 13, wherein the glass support portion comprises:

a first flange disposed on an inner edge of the glass opening part and connected to the channel assembly; and a second flange disposed on an outer edge of the glass opening part and connected to a body portion disposed on each of the front pillar, the center pillar, and the side upper reinforcement.

15. The side structure of claim 14, wherein the regulator mounting portion comprises a third flange disposed on an edge of the regulator mounting portion and connected to an opening flange disposed on the front pillar, the center pillar, and the side sill, respectively.

16. The side structure of claim 13, wherein the passenger seat area is positioned adjacent to a driver seat area, and wherein the driver seat area includes a door opening.

17. The side structure of claim 13, wherein the vehicle body is configured as a purpose-built vehicle having a driver seat with an associated door and the passenger seat area without an associated door.

18. The side structure of claim 13, wherein the channel assembly comprises:

an inner belt rail connected to a lower edge of the glass opening part;

a channel rail connected to side and upper edges of the glass opening part; and an outer belt rail disposed parallel to the inner belt rail at a predetermined interval and connected to the channel rail, wherein the inner belt rail and the outer belt rail form a glass passage therebetween for guiding the elevating glass.

19. The side structure of claim 13, further comprising a window regulator mounted to the regulator mounting portion and configured to move the elevating glass within the glass opening part.

20. The side structure of claim 13, wherein the front side opening part has no door frame structure, and wherein the surround panel provides structural support for the glass opening part without a door.

* * * * *